(12) United States Patent
Montgomery et al.

(10) Patent No.: US 9,163,424 B2
(45) Date of Patent: Oct. 20, 2015

(54) VISCOUS WALL COUPLING DAMPER

(71) Applicant: THE GOVERNING COUNCIL OF THE UNIVERSITY OF TORONTO, Toronto (CA)

(72) Inventors: Michael Montgomery, Toronto (CA); Constantin Christopoulos, Toronto (CA)

(73) Assignee: The Governing Council Of The University Of Toronto, Toronto (CA)

( * ) Notice: Subject to any disclaimer, the term of this patent is extended or adjusted under 35 U.S.C. 154(b) by 0 days.

(21) Appl. No.: 14/511,521

(22) Filed: Oct. 10, 2014

(65) Prior Publication Data

US 2015/0101268 A1    Apr. 16, 2015

Related U.S. Application Data

(60) Provisional application No. 61/889,909, filed on Oct. 11, 2013.

(51) Int. Cl.
*E04H 9/02* (2006.01)
*E04H 9/14* (2006.01)

(52) U.S. Cl.
CPC .. *E04H 9/14* (2013.01); *E04H 9/02* (2013.01); *E04H 2009/026* (2013.01)

(58) Field of Classification Search
CPC ............... E04H 9/02; E04B 1/98; F16F 7/00; F16F 7/003; F16K 15/02
USPC ............ 52/167.1, 167.3, 167.7, 167.8, 167.9, 52/167.6, 573.1, 393
See application file for complete search history.

(56) References Cited

U.S. PATENT DOCUMENTS

| | | | | |
|---|---|---|---|---|
| 5,740,652 A * | 4/1998 | Inoue et al. | ................... | 52/745.1 |
| 6,354,047 B1 * | 3/2002 | Shimoda et al. | ............. | 52/167.1 |
| 6,457,284 B1 * | 10/2002 | Isoda | ........................... | 52/167.1 |
| 6,601,350 B1 * | 8/2003 | Isoda | ........................... | 52/167.1 |
| 6,681,536 B1 * | 1/2004 | Isoda | ........................... | 52/167.8 |
| 7,076,926 B2 * | 7/2006 | Kasai et al. | ................... | 52/167.8 |
| 7,182,187 B2 * | 2/2007 | Mochimaru et al. | ........... | 188/297 |
| 7,987,639 B2 * | 8/2011 | Christopoulos et al. | ..... | 52/167.3 |
| 8,881,491 B2 * | 11/2014 | Christopoulos et al. | ..... | 52/741.3 |
| 2008/0307722 A1 * | 12/2008 | Christopoulos et al. | ..... | 52/167.1 |
| 2009/0211179 A1 * | 8/2009 | Willford | ....................... | 52/167.1 |
| 2012/0204509 A1 * | 8/2012 | Lim | .............................. | 52/393 |
| 2013/0283709 A1 * | 10/2013 | Christopoulos et al. | ..... | 52/167.1 |

* cited by examiner

*Primary Examiner* — Beth Stephan
(74) *Attorney, Agent, or Firm* — Elan IP Inc.

(57) ABSTRACT

A building structure in an outrigger configuration having a building core, at least one perimeter column, and at least one outrigger beam having a main body portion connected to the building core, an end portion distal from the building core in a direction of the at least one perimeter column and a vane portion extending from the end portion. At least one damper having a high-viscosity fluid container connected is connected to the at least one perimeter column and the vane portion extends into the high-viscosity fluid container to couple the building core to the at least one perimeter column, such that when the building structure is subjected to lateral loads and the building core is displaced with respect to the at least perimeter column, high-viscosity fluid within the high-viscosity fluid container is sheared by the vane to damp vibrations and provide coupling in the building structure.

18 Claims, 16 Drawing Sheets

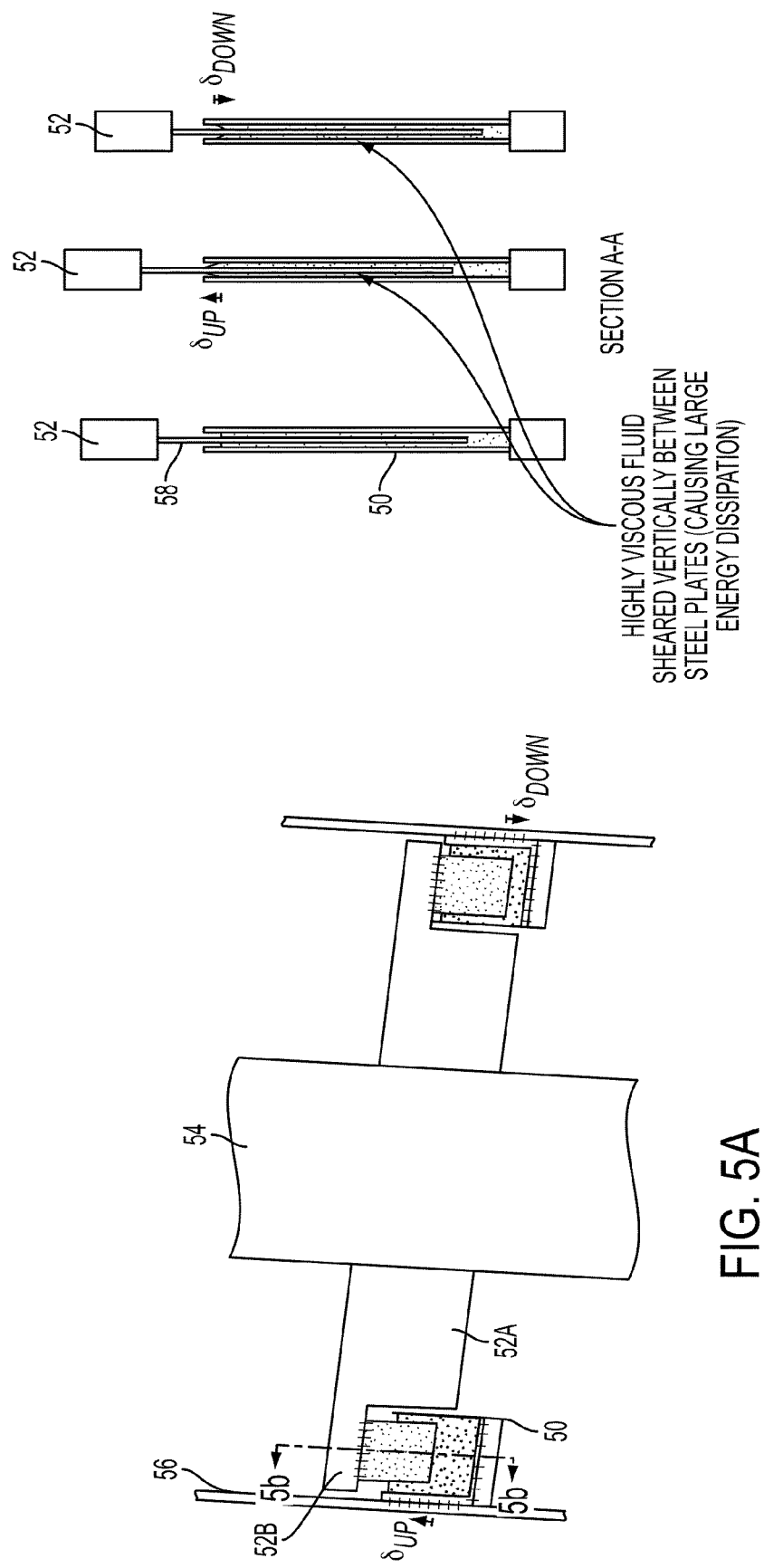

PLAN VIEW

VISCOUS WALL COUPLING DAMPER

FIELD OF THE INVENTION

The invention relates to the field of damping systems for buildings, and in particular to a coupling member used in outrigger building constructions including a viscous wall having damping effects.

BACKGROUND OF THE INVENTION

Outrigger style building constructions are well known and commonly used in the construction of tall buildings. Outrigger systems operate by creating a functional link between two structural systems, namely the internal core system and a perimeter system, such as external gravity columns. This arrangement is illustrated schematically in FIG. 1A. A building core 10 forms the internal support structure of a building, with perimeter columns 20 forming the external support structure of the building. The core 10 and perimeter columns 20 are physically connected by a stiff outrigger beam 30. While only a single outrigger beam 30 is illustrated, there could be a plurality of these up the height of the structure, depending on the height of the building. Combining these two systems leads to a positive interaction between the combined systems, particularly in resisting lateral loads applied to the building structure. The outrigger beams 30 are used to substantially increase the stiffness of the lateral load resisting system. When the building is subjected to lateral wind or earthquake loads the internal core wants to bend as a cantilever, but is resisted by the stiff outrigger beam which engages the external gravity columns vertically, as shown in FIG. 1B. In this configuration, significant care must be taken to ensure the structural members can resist the large forces introduced in the outrigger beam under lateral loads, as well as differential vertical movement between the columns and structural core due to different long-term settlement of the gravity columns and internal building core, particularly in reinforced concrete structural systems. These effects are widely known in the art.

U.S. Pat. No. 7,987,639 describes a damping system which has been adapted for use with an outrigger configuration, as illustrated in FIG. 2A. In this application, a stiff horizontal outrigger member 70 is connected to the building core 50 on one end and to a damper 40 on the other end. The damper 40 in turn connects the outrigger member 70 to the external perimeter columns 60. The damper as described in the aforementioned patent consists of a viscoelastic material bonded between interdigitated structural steel plates which are then anchored directly into the horizontal outrigger beam as well as the external gravity columns. When a building is deformed due to lateral wind or earthquake vibrations, large relative vertical displacements are introduced in-between the steel plates deforming the viscoelastic material in shear, as shown in more detail in FIGS. 2B and 2C. This shearing of the viscoelastic material adds damping to the coupled core-outrigger-perimeter building structure.

One problem of this prior art approach to damping in an outrigger arrangement is the differential vertical movement between the perimeter columns and the structural core due to different long-term relative movement of the perimeter columns and the internal building core. This movement and settling of the building can lead to complex design requirements, and the viscoelastic material layers in the damper run the risk of tearing or not operating as originally designed once the core and perimeter columns have moved relative to one another without adjusting the connection to compensate for the movement. That is, the relative position of the core with respect to the perimeter columns may differ slightly from the position when the building is constructed and parameters under which the damper is designed.

One other example of damping in an outrigger structure is shown in PCT publication number WO2007045900 to Ove Arup and Partners International Limited, however this system also fails to sufficiently remedy at least some of the problems mentioned above, and also has the problem of requiring regular or semi-regular maintenance to the dampers in this system. In addition, this prior art system does not exhibit a viscoelastic response which allows for coupling and damping and does not exhibit effective damping over the entire wide range of displacements that is expected for wind and earthquake loading.

Accordingly, there is a need in the art for providing improved damping in outrigger building configurations.

SUMMARY OF THE INVENTION

According to one embodiment of the invention, there is provided a building structure having a building core extending vertically from a ground; at least one perimeter column spaced in a plane parallel to the ground from the building core and defining the exterior perimeter of the building structure; at least one outrigger beam having a main body portion connected to the building core, an end portion distal from the building core in a direction of the at least one perimeter column and a vane portion extending from the end portion; at least one damper having a high-viscosity fluid container connected to the at least one perimeter column; wherein the vane portion extends into the high-viscosity fluid container to couple the building core to the at least one perimeter column, whereby when the building structure is subjected to lateral loads and the building core is displaced with respect to the at least perimeter column, high-viscosity fluid within the high-viscosity fluid container is sheared by the vane to damp vibrations in the building structure. In one variation of the invention, the high-viscosity fluid container is coupled to the at least one outrigger beam, and the vane portion extends from the at least one perimeter column, for example, via an intermediate beam.

In one aspect of the invention, the end portion of the at least one outrigger beam is narrower than the main body portion, such that a bottom end of the end portion is vertically spaced from a bottom end of the main body portion.

In another aspect of the invention, the at least one damper is positioned proximate and below the end portion, and wherein the at least one damper is sized and otherwise dimensioned such that a bottom end of the at least one damper is approximately co-planar with the bottom end of the main body portion.

In another aspect of the invention, the at least one damper further comprises first and second vertically extending steel plates and a floor surface between the steel plates defining the high-viscosity fluid container.

In another aspect of the invention, there is further provided a cover enclosing the high-viscosity fluid container and having a cut-out portion through which the vane portion extends.

In another aspect of the invention, there is further provided a dividing wall extending vertically from the floor surface; the dividing wall dividing the high-viscosity fluid container into two fluid containing portions.

In another aspect of the invention, the at least one outrigger beam further comprises an additional vane; the vane and the additional vane extending into respective ones of the two fluid containing portions.

In another aspect of the invention, the outrigger beam is positioned between more than one consecutive floors in the building structure; and wherein the outrigger beam is spaced from at least one of a floor above the outrigger beam and a floor below the outrigger beam.

In another aspect of the invention, the outrigger beam extends through an intermediate floor in the building structure to extend between three consecutive floors in the building structure.

In another aspect of the invention, the damper extends from a floor below the outrigger beam through the intermediate floor.

In another aspect of the invention, the damper is further connected to a floor below the outrigger beam.

According to another embodiment of the invention, there is provided in a building structure having a building core, a plurality of perimeter columns, and a plurality of outrigger beams, such that the building structure is arranged in an outrigger configuration, the improvement comprising a viscous wall coupling damper coupling at least one of the plurality of outrigger beams to at least one of the plurality of perimeter columns.

According to another embodiment of the invention, there is provided a building structure having a building core extending vertically from a ground; at least one perimeter column spaced in a plane parallel to the ground from the building core and at the exterior perimeter of the building structure; the at least one perimeter column having an intermediate beam extending horizontally and towards the building core and a vane attached to the intermediate beam; at least one outrigger beam having a main body portion connected to the building core and an end portion distal from the building core in a direction of the at least one perimeter column; at least one damper having a high-viscosity fluid container connected to the at least one outrigger beam; wherein the vane portion extends into the high-viscosity fluid container to couple the building core to the at least one perimeter column, whereby when the building structure is subjected to lateral loads and the building core is displaced with respect to the at least one perimeter column, high-viscosity fluid within the high-viscosity fluid container is sheared by the vane to damp vibrations in the building structure.

BRIEF DESCRIPTION OF THE DRAWINGS

Embodiments will now be described, by way of example only, with reference to the attached Figures, wherein:

FIGS. 5A and 5B are schematic views showing the damper and outrigger of the invention.

DETAILED DESCRIPTION OF THE INVENTION

In order to alleviate the prior art problem associated with long term settling of the building core and perimeter columns in outrigger building configurations, while still providing sufficient damping to resist lateral loads, it would be beneficial to provide a damper which is adaptable to the respond to a changing relative position between the building core and the perimeter columns as long-term settling of the building takes hold while still providing both coupling and damping to the structural system. Broadly, the invention provides for a novel damper and outrigger arrangement which solves some of the prior art problems, and optionally provides additional benefits which will be detailed below. Improvements upon other prior art systems include the solving of fatigue issues experienced with axial configured dampers and the capability of adding damping without any compliance issues experienced with axial configured dampers. Thus, some of the issues addressed are: i) long-term differential movement, ii) fatigue and iii) compliance issues and iv) some stiffness at lower displacements.

Compliance Issues—Generally axial viscous dampers have mechanical components (seals and pins) which cause compliance issues in the response (the viscous mechanism is not engaged immediately) and therefore for lower amplitude vibrations such as low amplitude wind storms and low amplitude earthquakes the viscous response may not be achieved. Because the coupling wall damper damping mechanism is engaged immediately by shearing the viscous material, the damping response is instantaneous and therefore can be used for all types of vibrations (low level wind and low level earthquake vibrations through very large earthquakes).

Fatigue Issues—There is no maintenance required for viscous wall dampers according to the invention. Axial viscous dampers can have issues with respect to fatigue related to the mechanical components (seals and pins).

Stiffness—There is a stiffness component in the response of the viscous wall especially at low amplitude displacements, which is helpful in the response of the buildings to wind loads. There is no stiffness typically in viscous dampers and as mentioned prior at low displacement amplitudes there are issues with compliance (ie no response at all~viscous or stiffness).

Figures 1A, 1B:
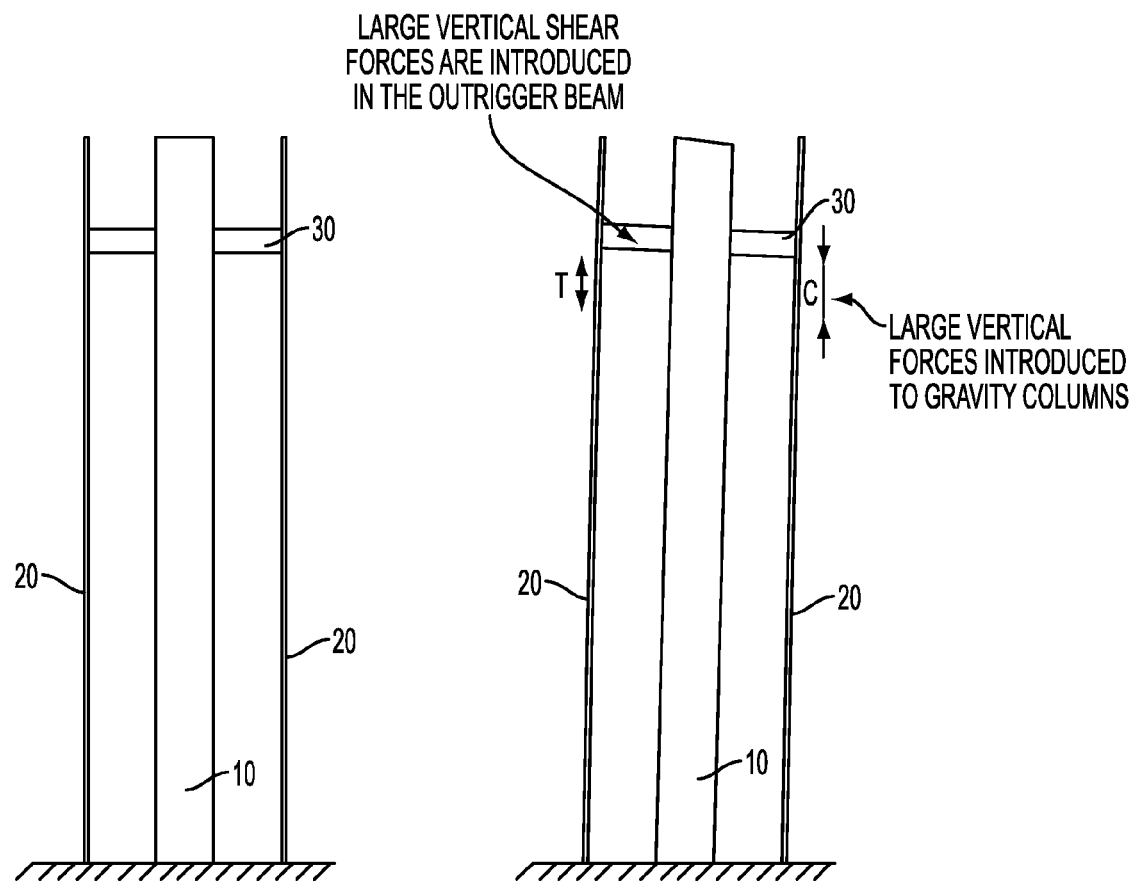
FIGS. 1A and 1B are schematic views showing an outrigger building configuration.
Figure 2A:
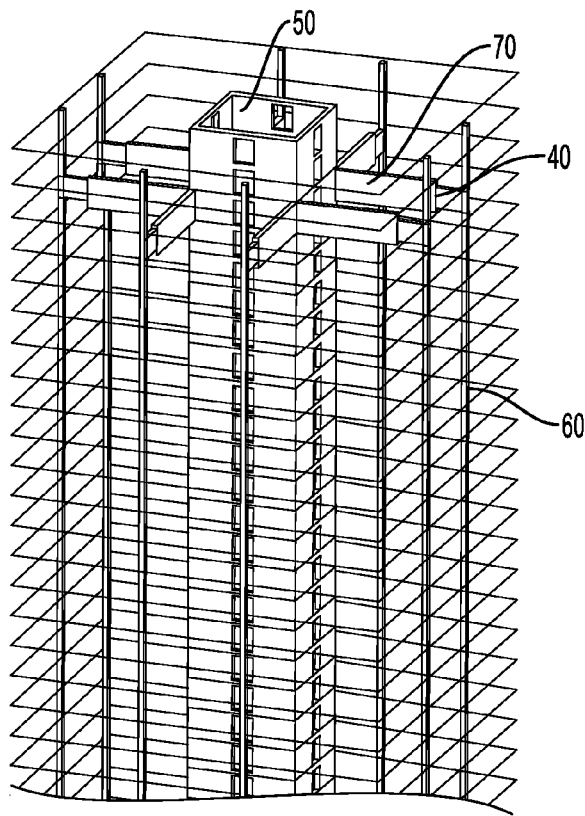
FIGS. 2A, 2B, and 2C show a prior art damping arrangement in an outrigger building configuration.
Figure 2B:
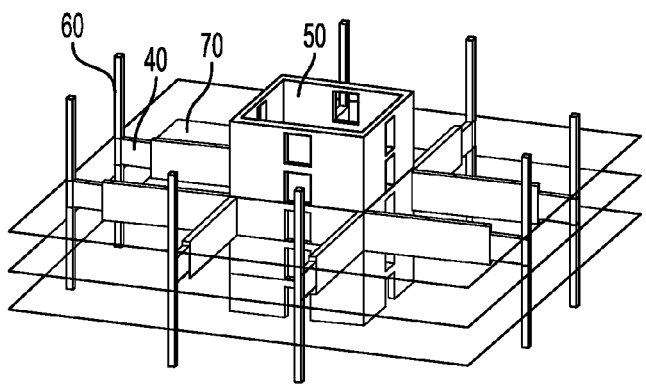
Figure 2C:
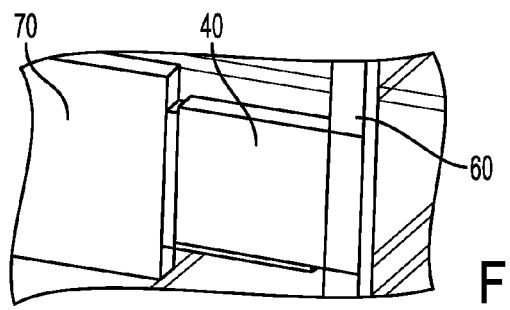
Figure 3A:
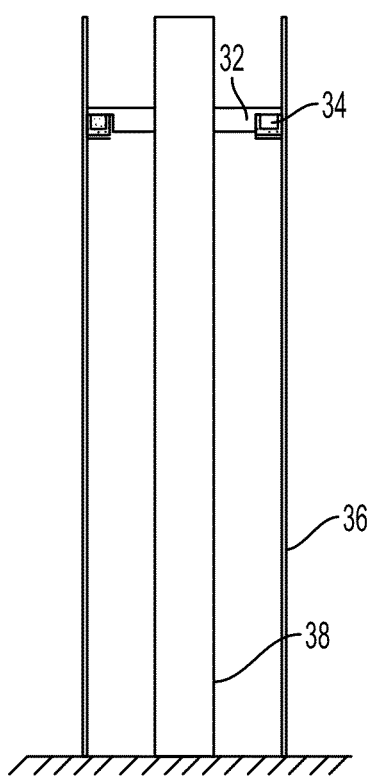
FIGS. 3A and 3B schematically show one embodiment of the invention in an undeformed shape and in a deformed shape, respectively.
Figure 3B:
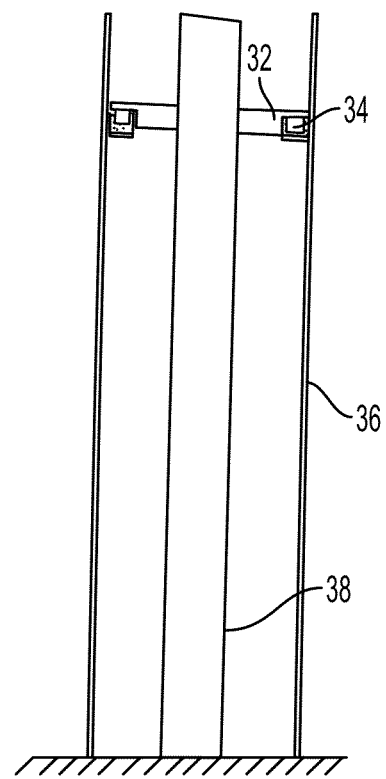

In this regard, embodiments of the invention generally include a viscous wall damper configured in-place of an outrigger beam coupling the structural core with the perimeter columns in a building configuration, preferably a tall building configuration. The general configuration is illustrated in FIGS. 3A and 3B, where a single outrigger 32 is shown for illustrative purposes only. The internal building core 38, forming the primary support structure of the building is surrounded by a number of external perimeter columns 36. Perimeter columns 36 are interchangeably referred to as gravity columns 36. An outrigger beam 32 is positioned so as to couple the dynamic reaction of the internal core 38 to that of the perimeter columns 36, thus providing for an overall stiffer building structure. A damper 34 is disposed between the outrigger beam 32 and the external perimeter columns 36 to complete the coupling of the building core 38 with the perimeter columns 36. The damper 36 is intended to provide a degree of relative vertical motion between the internal core 38 and exterior columns 36 during exposure to lateral loads, such as those caused by wind and earthquake lateral loads. FIG. 3B illustrates the motion of the system as a lateral load is applied. The core 38 undergoes cantilevered deformation, which in turn produces rotational movement in the outrigger beam 32. This results in large relative vertical displacements in the damper. While the damper is described in more detail below, these vertical displacements result in damped movement within a highly viscous fluid of a steel vane plate connected to the outrigger beam. The damper is herein termed as a viscous wall damper.

Figure 4:
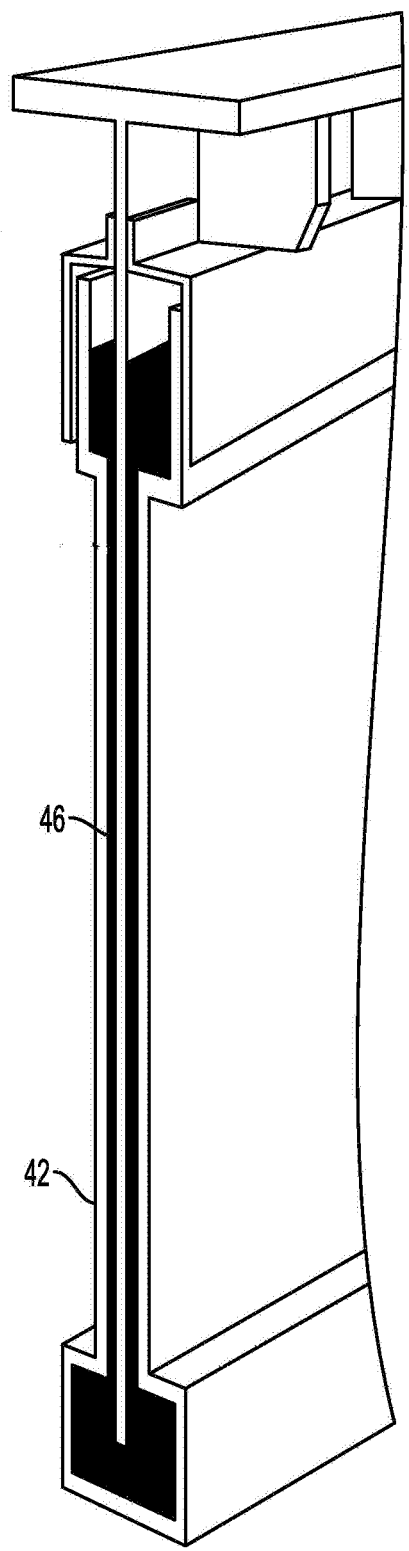
FIG. 4 is a detailed view of a viscous wall damper as used in the damping system of the invention.

One example of an exemplary viscous wall damper is shown in FIG. 4. The illustrated viscous wall damper consists of a steel container 42, which may be made of a pair of vertically extending steel plates connected to a lower floor or support surface, and a vane in the form of an inner steel plate 46 connected to an upper surface, which in this application would preferably be the outrigger beam. The steel container 42 is filled with a highly viscous fluid which is horizontally sheared when the lower and upper surfaces move horizontally relative to one another. While the viscous wall dampers have been used in other applications, the specific structural details of implementation within the outrigger configuration as herein described is thought to be novel by the applicant, and provides for a number of surprising advantages, as will be outlined in more detail below. A top enclosure may be provided to prevent leakage or spillage of the highly viscous fluid. In any event, the operation of viscous wall dampers, their manufacture and general characteristics are described in U.S. Pat. No. 5,740,652 issued Apr. 21, 1998 to Inoue et al., and in U.S. Pat. No. 6,037,403 issued Mar. 14, 2000 to Katase et al. the contents of each of these are herein incorporated by reference in their entirety.

Referring now to FIGS. 5A and 5B, there is shown one embodiment of the invention, in which a viscous wall damper 50 is arranged as a coupling between the outrigger beam 52 and the perimeter column 56. This coupling links the response of the building core 54 with that of the perimeter columns 56. In order to provide the intended damping to the overall building structure, a vane 58 is attached to the end of the outrigger beam 52 distal from the building core 54 and adapted to plunge vertically into the steel plate container of the viscous wall damper, or out of the steel plate container, thereby shearing the highly viscous fluid vertically which adds significant levels of damping or energy dissipation to the overall building as lateral loads applied to the building cause relative movement between the outrigger beam 52 and the perimeter columns 56. It should also be noted, that while most damping occurs by vertical shearing of the fluid, the vane is also able to move horizontally and rotationally within the fluid to thereby be more adaptable than prior art systems to other modes of relative movement caused by loads applied to the structure. FIG. 5B shows the relative movement of the vane 58 within the damper 50. In the embodiment shown in FIGS. 5A and 5B, the damper 50 is connected entirely to the perimeter column. The outrigger beam 52 consists of a main beam portion 52A and an end portion 52B. The main beam portion 52A is sized and otherwise dimensioned as would be the case in prior art outrigger building configurations. The end portion 52B is narrower than the main beam portion 52A and has a cut-out section sized to approximately correspond to that of the damper 50. The vane 58 extends down from the end portion 52B and into the viscous fluid of the damper 50. In this manner, the combination of the end portion 52B and the damper 50 has a height approximately equivalent to that of the main portion 52A of the outrigger beam 52. For the purposes of this application, references to the term "height" refer to a direction perpendicular to the ground or extending upwards in the direction of the building.

Figure 6A:
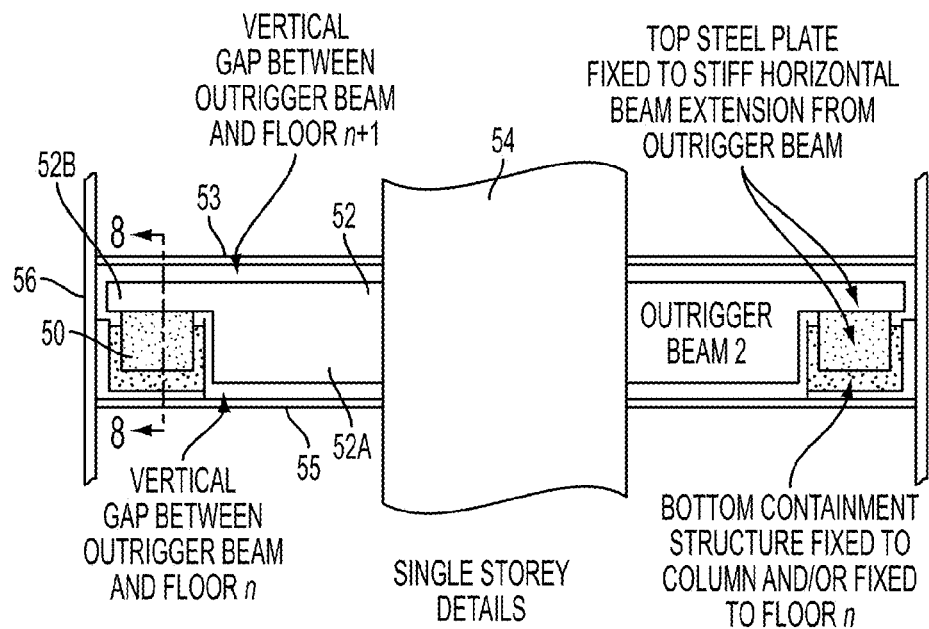
FIGS. 6A and 6B show implementation details in a single-storey outrigger and in a two-storey outrigger, respectively.
Figure 6B:
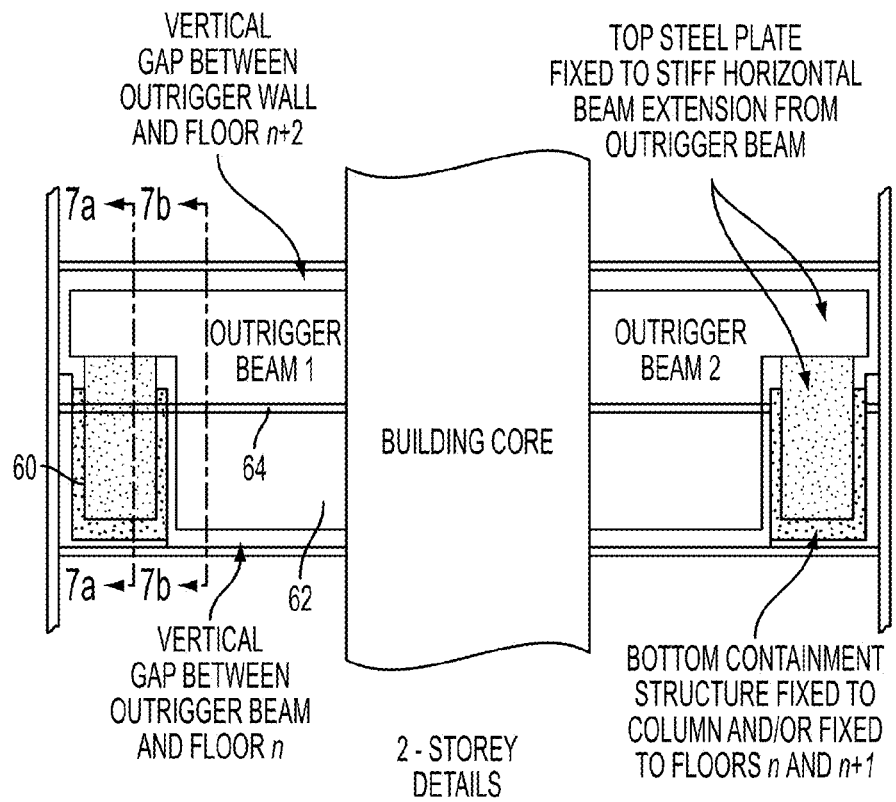

Preferably, the vane 58 is rigidly connected to the end portion 52B, which is a stiff structural extension from the main body portion 52A which itself extends from the building core 54. FIGS. 6A and 6B show optional variations on the implementation in a single storey outrigger and a two-storey outrigger, respectively. For greater clarity, a single storey outrigger is one in which the outrigger beam, and specifically the main body portion of the outrigger beam fits in its entirety between two consecutive floors in a building. A two-storey outrigger extends through at least one floor in a building such that the outrigger beam fits in its entirety between three consecutive floors in a building. The invention contemplates, and is applicable to, outriggers spanning more than two floors, where possible to a person skilled in the art and fitting within required building design limitations, with corresponding adaptations made to the size of the high-viscosity fluid container.

In one possible implementation of a single storey configuration as shown in FIG. 6A, the vane is connected to the stiff horizontal outrigger beam and the bottom steel containment plates holding the fluid of the damper 50 are attached to the floor at the meeting point of the floor and a respective gravity column 56. As illustrated, there is a vertical space between the outrigger beam 52 and the floor 53 above the outrigger beam 52, and a similar vertical gap between the outrigger beam the floor 55 below the outrigger beam 52.

FIG. 6B shows the two-storey implementation, where the outrigger beam 62 extends through a portion of the intermediate floor 64. This could be hidden from view, for example by positioning the outrigger beam 62 within a wall on each floor. The damper 60 and vane also extend through the intermediate floor as illustrated.

Figure 7A:
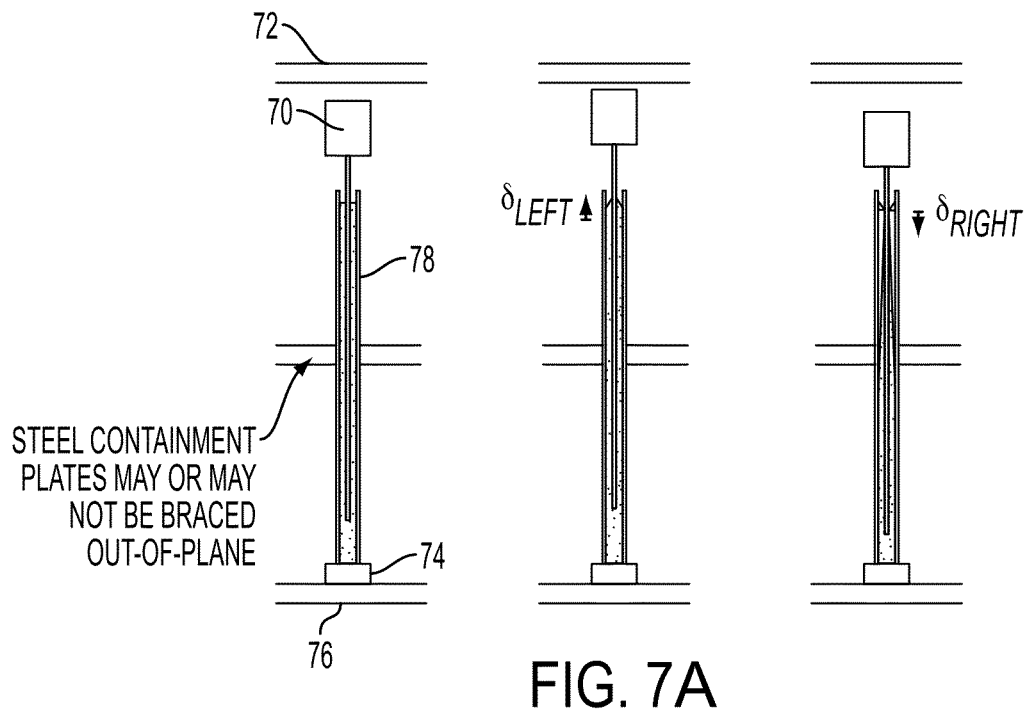
FIGS. 7A and 7B show additional implementation details of the two-storey configuration of FIG. 6b.
Figure 7B:
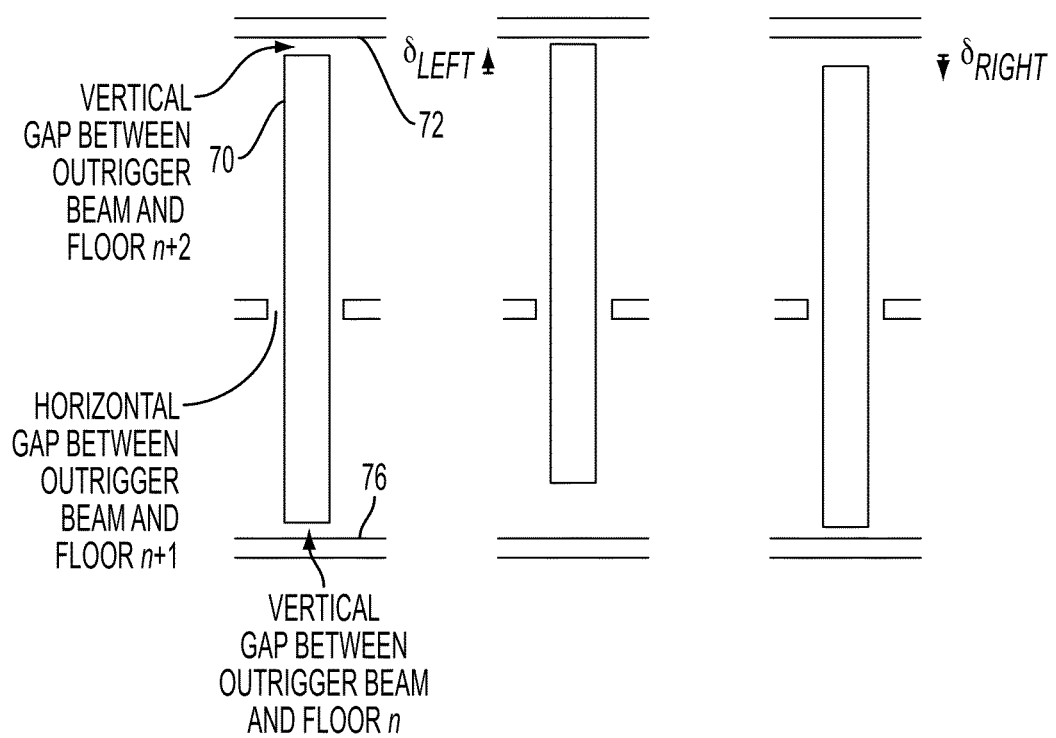

FIG. 7 shows additional details of the two-storey configuration. In the top view, the gap between the outrigger beam 70 and the floor above 72 is clearly visible, and the connection of the damper to the bottom floor 76 is shown. In the bottom view, the damper is removed to show the main body portion of the outrigger beam having a vertical gap between each of the upper 72 and lower 76 floors. This ensures that there is no interference created when the structural core rotates during lateral loads as shown in the incremental views in FIG. 7, where the outrigger beam 70 is being displaced vertically, interference with the floor above 72 and the floor below 76 is eliminated. This prevents unexpected structural damage and allows the outrigger beam 70 a degree of movement, which is damped by way of the viscous wall damper 78.

Figure 8:
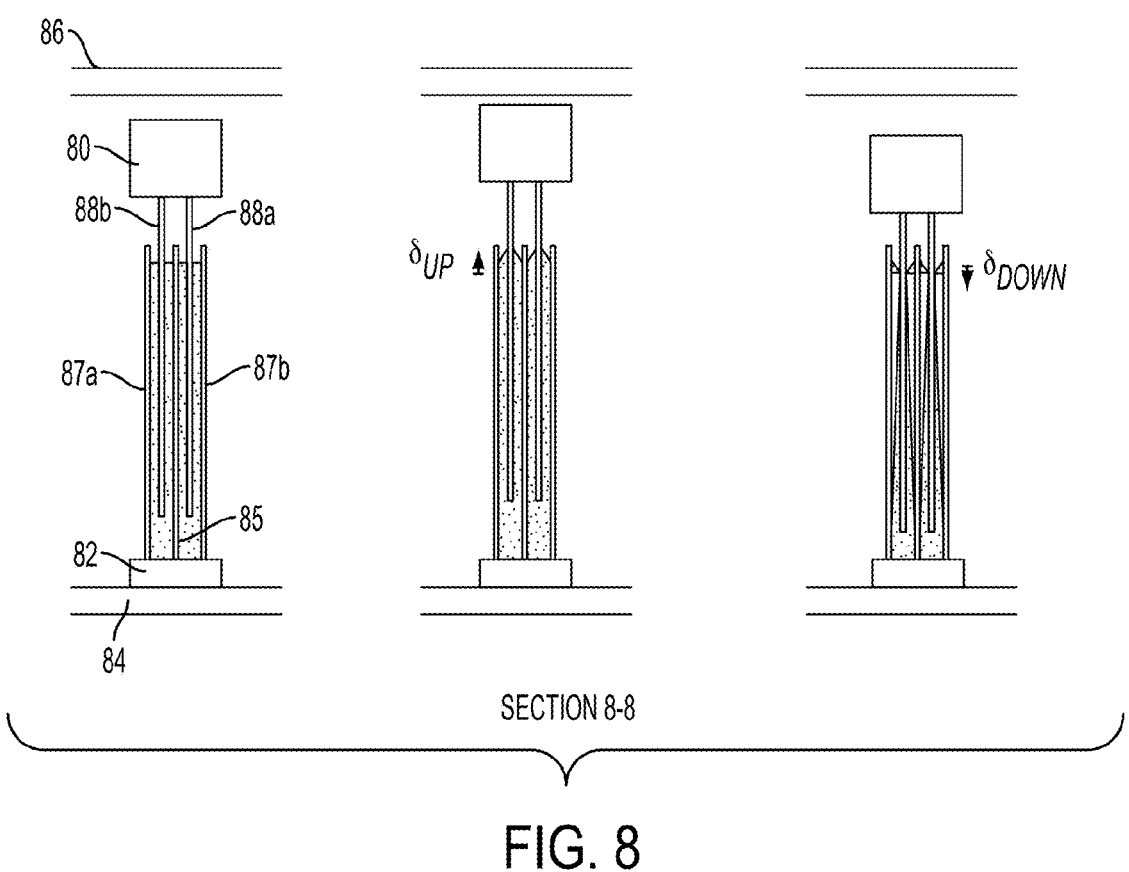
FIG. 8 shows another embodiment of the viscous wall coupling damper and outrigger combination of the invention.

In a variation of the invention, the viscous wall damper includes multiple, and preferably two vanes. This variation is illustrated in FIG. 8 and is equally applicable to each of the embodiments earlier described. The use of multiple vane plates results in multiple shear planes within the viscous wall damper, thereby providing additional damping. With reference to FIG. 8, there is shown a cross-section with the outrigger beam 80 (connected to the core, but not illustrated in this view) spaced vertically from an upper floor 86. The outrigger beam 80 has a pair of vanes 88a and 88b extending downwardly therefrom and into the viscous wall damper 82. The viscous wall damper 82 is formed from a pair of outer walls 87a and 87b, connected to a base which together encloses the high viscosity fluid therebetween. A dividing wall 85 extends upwardly from the base to divide the high viscosity fluid space in two compartments. The pair of vanes 88a and 88b are adapted to extend into the compartments defined by the dividing wall 85 and the outer walls 87a and 87b. Subsequent views in FIG. 8 show the vertical displacement of the pair of vanes 88a and 88b within the fluid chamber as the building is subjected to lateral loads.

Figure 9:
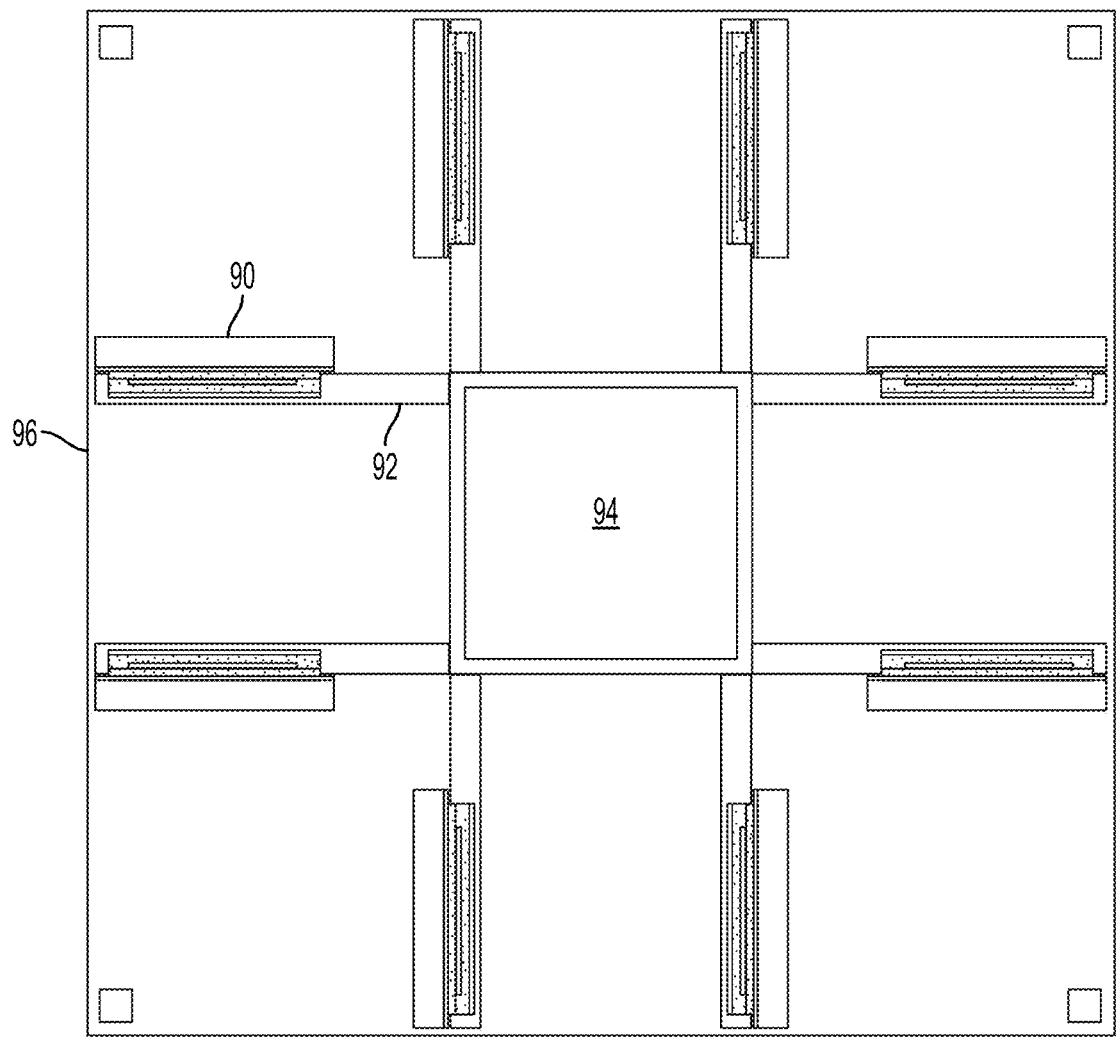
FIG. 9 is a top view of a building cross-section employing the outrigger and viscous wall coupling damper combination of the invention.

FIG. 9 is a top sectional view showing a plurality of viscous wall dampers 90 coupling a plurality of outrigger beams 92 between a building core 94 and the perimeter columns 90. In this illustration, the perimeter columns 90 are offset from the building core 94 such that a pair of outrigger beams 92 extends from each side of the building core 94.

Figure 10A:
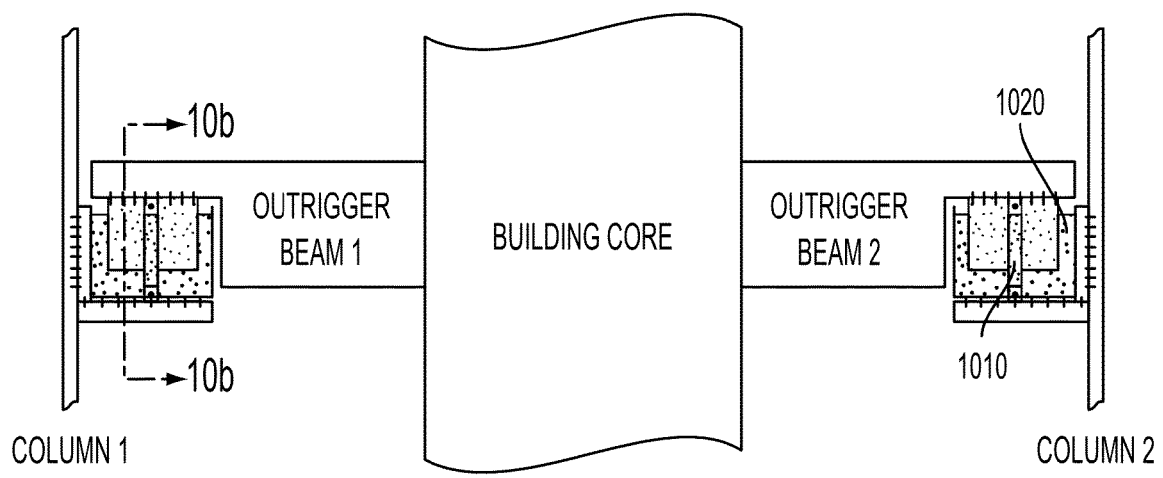
FIGS. 10A, 10B and 11 show embodiments of the invention in combination with force limiting fuse members connected in parallel and in series, respectively.
Figure 10B:
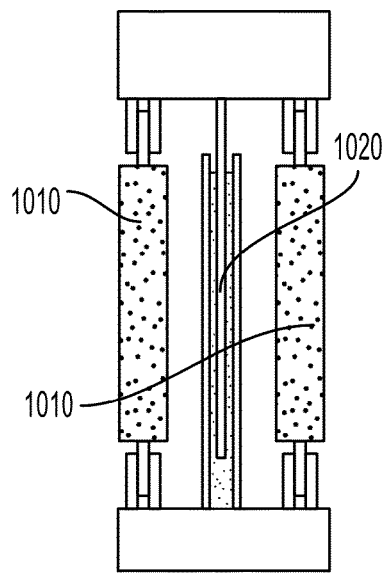
Figure 11:
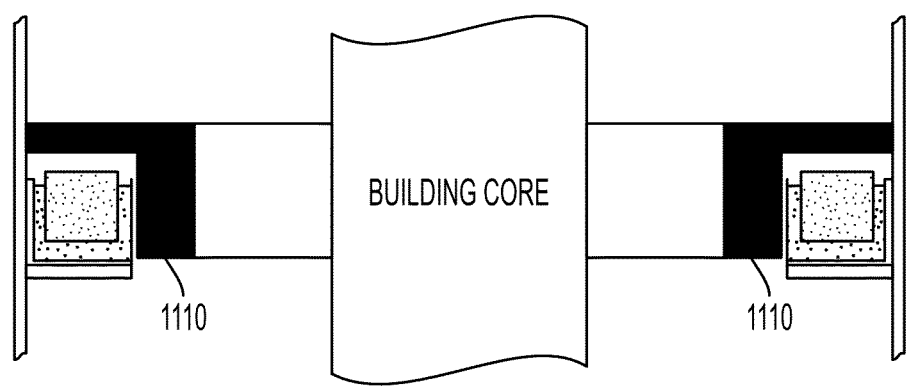

It is also contemplated that the viscous wall damping system as herein applied to outrigger building configurations may be installed in series or in parallel with other force limiting structural systems in order to control the force imparted on the perimeter columns. These force limiting structural systems may include self-centering energy dissipating braces (SCED's), buckling restrained braces (BRBs), steel plate shear wall, scorpion systems, etc. An example of this implementation is shown in FIGS. 10A and 10B, where a force limiting fuse element 1010 is shown in parallel with the viscous wall coupling 1020 damper of the invention. Alternatively, as shown in FIG. 11, a force limiting fuse element 1110 may also be connected in series.

While the embodiments of the invention described above have shown particular benefits in regards to differential movement between floor slabs and the outrigger beams, analogous principles can be applied in implementing the invention to target other sources of differential movement in the structure.

Figure 12:
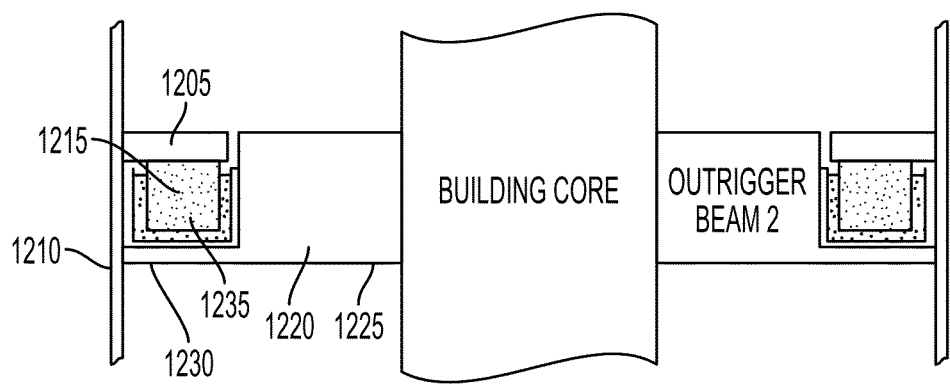
FIG. 12 is a schematic view showing another embodiment of the invention.

With reference to FIG. 12, there is shown another embodiment of the invention in which an intermediate beam 1205 extends from the perimeter column 1210 for the purposes of supporting a vane 1215. The outrigger beam 1220 in this embodiment consists of a main body portion 1225 and an end portion 1230, with the end portion 1230 extending from the main body portion 1225 on the side of the outrigger beam 1220 closer to the ground. A viscous wall damper 1235 is provided, and may incorporate features of the viscous wall damper as described herein. The underside of the viscous wall damper 1235 is connected to the end portion 1230 of the outrigger beam 1220. The vane 1215 extends from the intermediate beam 1205 and into the viscous wall damper 1235, and functions in a manner consistent with other embodiments as herein described. In the embodiment of FIG. 12, the viscous wall damper is connected to the outrigger beam, and the vane connected to the perimeter column via the intermediate beam.

Figure 13:
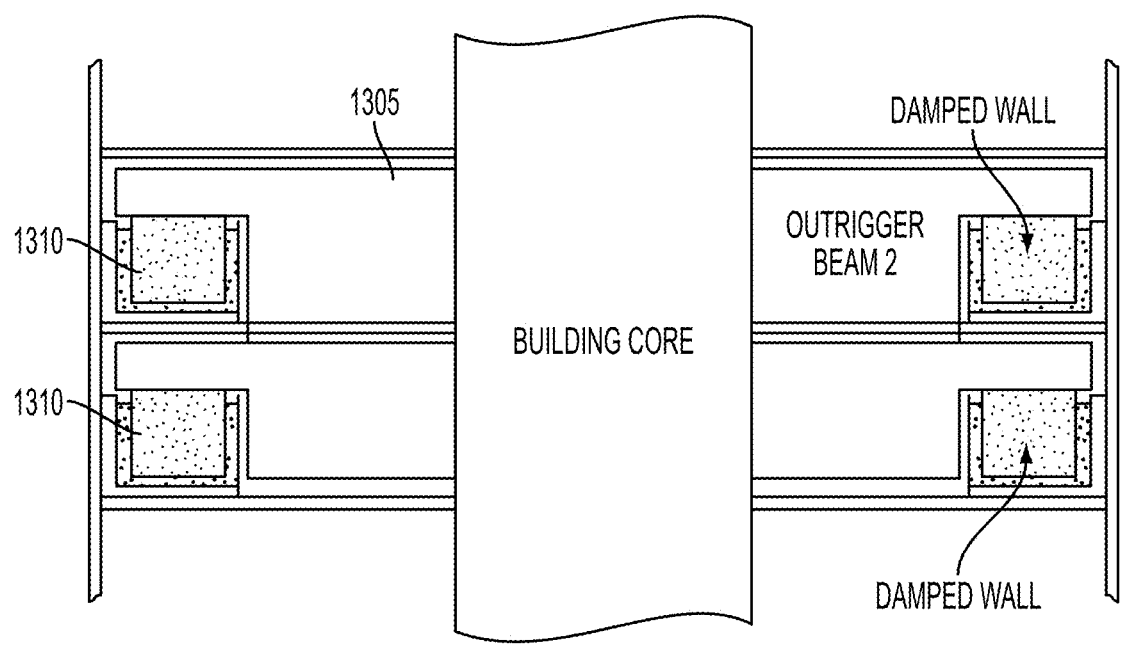
FIG. 13 is a schematic view of an embodiment of the invention employing multiple viscous wall dampers in a single outrigger beam.

FIG. 13 shows a variation of the invention in which each outrigger beam 1305 has more than one, in this case illustrated as two, associated viscous wall dampers 1310. The connection details and specifics of implementation may be as described with respect to any of the other embodiments herein described. An adaptation is only made to the end portion of the outrigger beam which has a distinct end portion for each viscous wall damper, as illustrated in FIG. 13.

Figure 14:
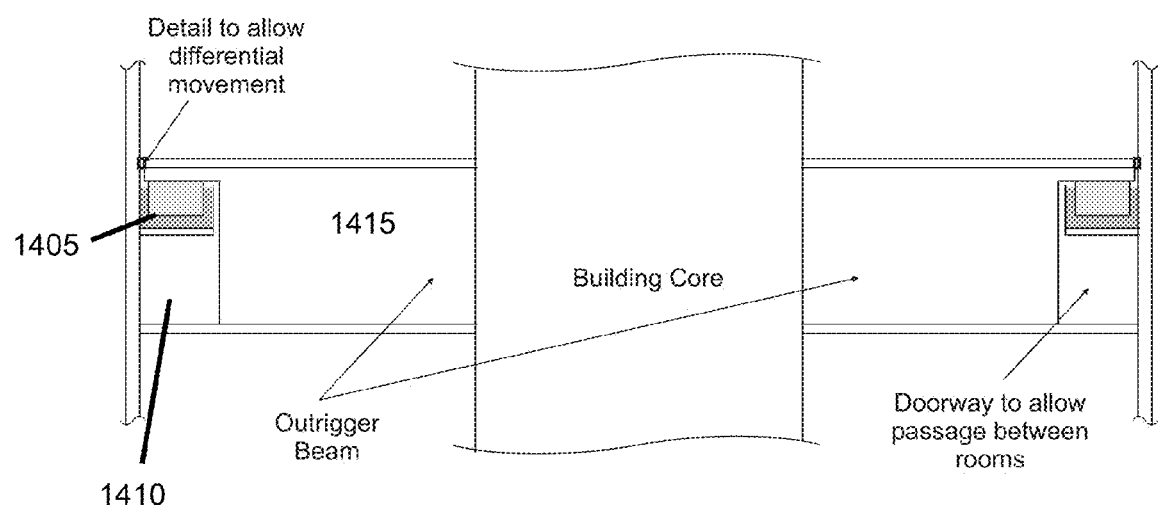
FIG. 14 is a schematic view of an implementation of the viscous damper of the invention integrated with a doorway in the outrigger beam

FIG. 14 illustrates an adaptation of the principles of the invention to an implementation where the viscous wall damper 1405 is sized, and otherwise dimensioned to be positioned above a doorway passage 1410 formed through a portion of the outrigger beam 1415. A spacing is provided between the damper and the perimeter column to allow for differential movement between the elements surrounding the doorway passage. It should be noted that the doorway passage does not have to be located at an extremity of the outrigger beam as illustrated, and may be positioned between either end of the outrigger beam. The doorway passage will be reinforced as is generally known in the art, with the viscous damper positioned above the doorway, and connected to the outrigger beam (via a vane as previously described) and to the perimeter column, when the doorway is in the position illustrated. In this adaptation, the viscous damper is likely to be smaller in size than in the previous embodiments described.

Figure 15:
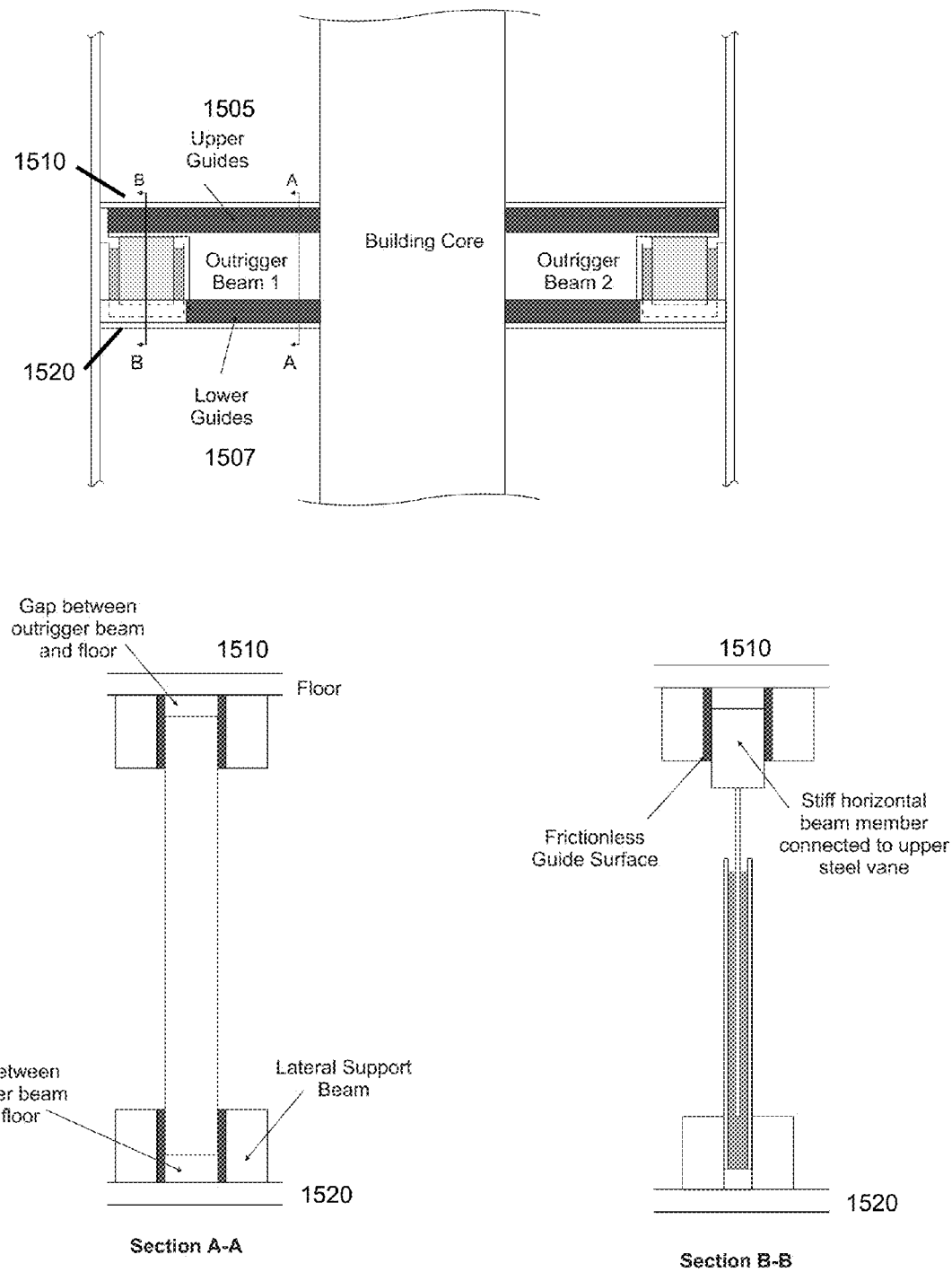
FIG. 15 illustrates an optional restraint system that could be used to ensure the outrigger beam and vane of the invention moves within the plane of a building wall.
Figure 16:
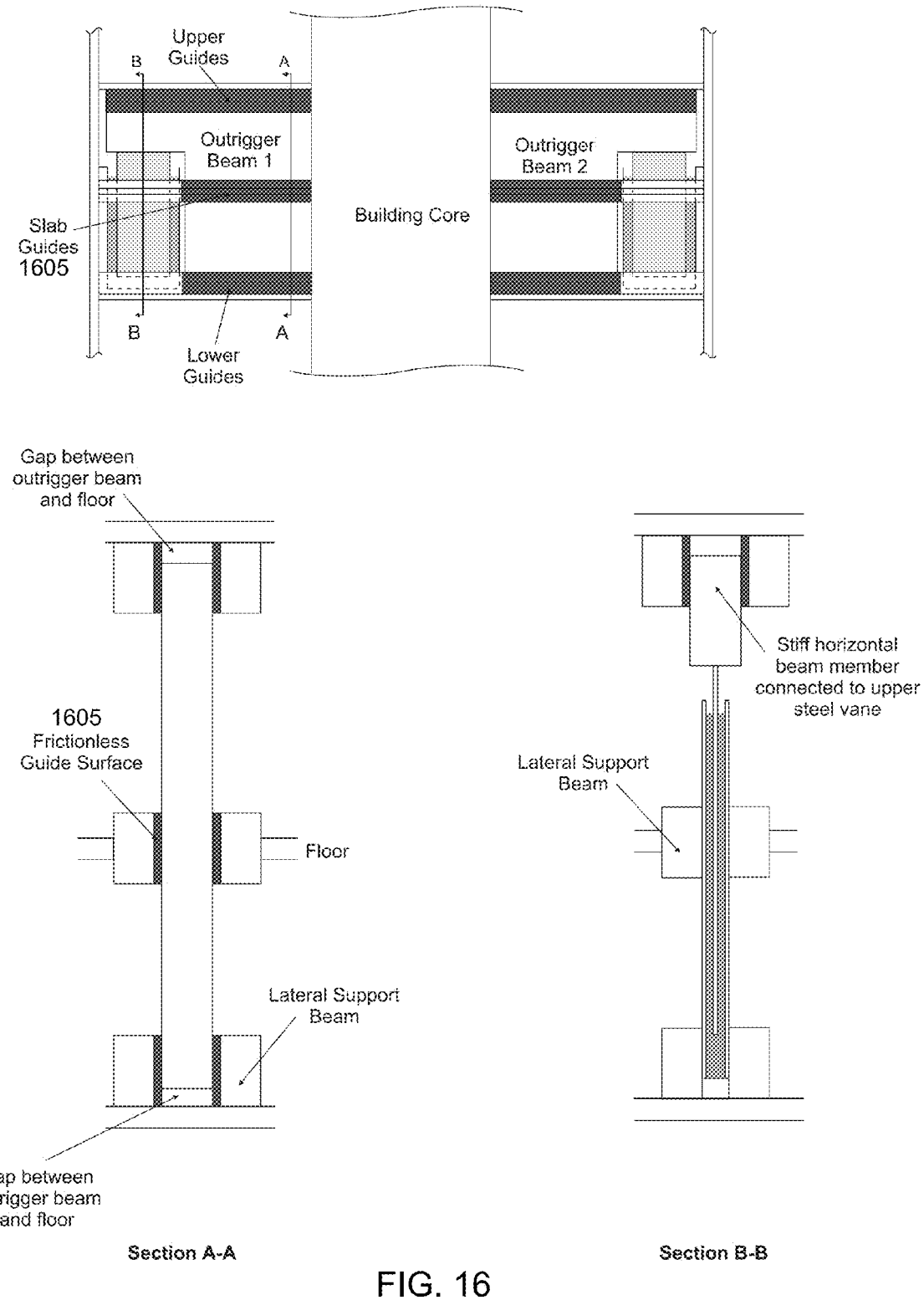
FIG. 16 shows a variation on the restraint system of FIG. 15.

FIGS. 15 and 16 show two optional variations of the invention, in which one or both of upper and lower guides 1505, 1507 are provided between the outrigger beam and the floor above 1510 and the floor below 1520. These guides are preferably low friction or frictionless surfaces which do not impede movement of the outrigger beam (and thus the vane), but do keep movement of the outrigger beam within the plane of the building wall, thus eliminating or drastically reduces any out-of-plane forces and/or displacements imposed on the system. FIG. 16 shows a multi-floor implementation where additional guides 1605 are provided between the outrigger beam and the intermediate floor as well.

Various advantages and surprising results may be achieved in implementing one or more of the various embodiments and variations of the invention as herein described. First, applying the viscous wall damper to act as a coupling damper between an outrigger beam and the perimeter column, such that the outrigger beam couples the response of the building core with that of the perimeter column. The adaptations made to the outrigger beam as described maintain the integrity of the outrigger connection and coupling, while also providing for relative vertical movement of the outrigger within the damper. In essence, a portion of the outrigger beam is replaced with the viscous wall damper. With this arrangement, the action of dissipating energy (ie. added damping) occurs as the vane plate attached to the outrigger beam plunges in the vertical direction within the viscous fluid in the damper, thus shearing the viscous fluid vertically between the vane plate and lower containment plates.

While the scale and size of the outrigger beam and viscous wall damper will depend on the particular implementation, size of the building, and susceptibility of the building to lateral loads, certain design principles could be set forth to facilitate optimal results. For example, the outrigger beam is preferably sized, and otherwise dimensioned to ensure that the majority of deformation occurs between the vane and the container plates. That is, interference with other elements is ideally minimized to realize the full damping effects. In addition, the vane, preferably made of steel, is attached to an end portion of the outrigger beam, which end portion is a still, horizontally extending member, in order to translate the motion from the building core. The end portion must be sized, and otherwise dimensioned to also transmit large vertical forces. It is also preferred that the containment plates holding the fluid in the damper are attached to a floor immediately beneath the outrigger, and that the containment plates extend directly to the perimeter columns. Cumulative, the system will allow slow differential vertical movement between the columns and the internal structural core without imparting any extra forces into the system. This typically requires significant monitoring and compensation when prior art outrigger systems are used.

The implementation of the viscous wall damper as a coupling for the outrigger beam provides an efficient location to add damping to the overall building structure. Specifically, it does not take up any sellable or architectural space, by virtue of fitting within the original footprint of a full sized outrigger beam. In addition, there are no currently known compliance issues, and therefore the system is effective for small through very large displacement amplitudes.

The damper is also not subject to permanent deformation, as prior art systems are which rely on viscoelastic damping materials or other mechanical interactions in which performance of the damper can degrade over time due to the static deformations of the material. Accordingly, there is no required maintenance. The fluid within the container can be sealed such that there is leakage. In addition, there are no fatigue-related problems, which can be an issue in axial damper systems. Finally, the vane and damper interaction readily adapts to long term settling of the building as the home or default position of the vane within the damper is not fixed, and can be varied over time. For example, if the core of the building moves with respect to the perimeter over time as the building settles, even by a very small amount, the vane simply moves within the fluid to a new default position from which vibrations are damped. Prior art systems are not so adaptable, and require the damper to deform due to the long term settling, making design complex and difficult.

The scope of the claims should not be limited by the preferred embodiments set forth in description of the preferred embodiments or in the examples, but should be given the broadest interpretation consistent with the description as a whole.

The invention claimed is:

1. A building structure comprising:
   a building core extending vertically from a ground;
   at least one perimeter column spaced from the building core and at the exterior perimeter of the building structure;
   at least one outrigger beam having a main body portion connected to the building core, an end portion distal from the building core in a direction of the at least one perimeter column and a vane portion extending from said end portion;
   at least one damper having a high-viscosity fluid container connected to said at least one perimeter column;
   wherein said vane portion extends vertically into and out of said high-viscosity fluid container to couple the building core to the at least one perimeter column, such that permanent differential vertical deformations in the building structure are accommodated by said vane portion extending vertically into or out of said high-viscosity fluid container; and whereby when the building structure is subjected to lateral loads and the building core is displaced with respect to the at least one perimeter column, high-viscosity fluid within the high-viscosity fluid container is sheared by said vane portion to damp vibrations in the building structure.

2. The building structure according to claim 1, wherein the end portion of the at least one outrigger beam is narrower than said main body portion, such that a bottom end of said end portion is vertically spaced from a bottom end of said main body portion.

3. The building structure according to claim 2, wherein said at least one damper is positioned proximate and below said end portion.

4. The building structure according to claim 1, wherein said at least one damper further comprises first and second vertically extending steel plates and a floor surface between said steel plates defining said high-viscosity fluid container.

5. The building structure according to claim 4, further comprising a cover enclosing said high-viscosity fluid container and having a cut-out portion through which said vane portion extends.

6. The building structure according to claim 4, further comprising a dividing wall extending vertically from said floor surface; said dividing wall dividing said high-viscosity fluid container into two fluid containing portions.

7. The building structure according to claim 6, wherein said at least one outrigger beam further comprises an additional vane; said vane portion and said additional vane extending into respective ones of said two fluid containing portions.

8. The building structure according to claim 1, wherein said outrigger beam is positioned between at least two consecutive floors in the building structure; and wherein said outrigger beam is spaced from at least one of a floor above said outrigger beam and a floor below said outrigger beam.

9. The building structure according to claim 1, wherein said damper is further connected to a floor below said outrigger beam.

10. The building structure according to claim 1, further comprising at least one force limiting fuse member connected in series or in parallel with said at least one viscous wall coupling damper.

11. A building structure comprising:
    a building core extending vertically from a ground;
    at least one perimeter column spaced in a plane parallel to the ground from the building core and at the exterior perimeter of the building structure;
    at least one outrigger beam having a main body portion connected to the building core, an end portion distal from the building core in a direction of the at least one perimeter column and a vane portion extending from said end portion;
    at least one damper having a high-viscosity fluid container connected to said at least one perimeter column;
    wherein said vane portion extends into said high-viscosity fluid container to couple the building core to the at least one perimeter column, whereby when the building structure is subjected to lateral loads and the building core is displaced with respect to the at least one perimeter column, high-viscosity fluid within the high-viscosity fluid container is sheared by said vane to damp vibrations in the building structure;
    wherein said outrigger beam extends through an intermediate floor in the building structure to extend between three consecutive floors in the building structure.

12. The building structure according to claim 11, wherein said damper extends from a floor below said outrigger beam through said intermediate floor.

13. In a building structure having a building core, a plurality of perimeter columns, and a plurality of outrigger beams, such that the building structure is arranged in an outrigger configuration, the improvement comprising a viscous wall coupling damper coupling at least one of the plurality of outrigger beams to at least one of the plurality of perimeter columns such that a vane portion of the viscous wall coupling damper extends vertically into and out of a high-viscosity fluid container to couple the building core to the at least one perimeter column, such that permanent differential vertical deformations in the building structure are accommodated by said vane portion extending vertically into or out of said high-viscosity fluid container.

14. The building structure according to claim 13, wherein said outrigger beam is positioned between at least two consecutive floors in the building structure; and wherein said outrigger beam is spaced from at least one of a floor above said outrigger beam and a floor below said outrigger beam.

15. A building structure comprising:
a building core extending vertically from a ground;
at least one perimeter column spaced from the building core and at the exterior perimeter of the building structure; said at least one perimeter column having an intermediate beam extending horizontally and towards said building core and a vane attached to said intermediate beam;
at least one outrigger beam having a main body portion connected to the building core and an end portion distal from the building core in a direction of the at least one perimeter column;
at least one damper having a high-viscosity fluid container connected to said at least one outrigger beam;
wherein said vane extends vertically into and out of said high-viscosity fluid container to couple the building core to the at least one perimeter column, such that permanent differential vertical deformations in the building structure are accommodated by said vane portion extending vertically into or out of said high-viscosity fluid container; and whereby when the building structure is subjected to lateral loads and the building core is displaced with respect to the at least one perimeter column, high-viscosity fluid within the high-viscosity fluid container is sheared by said vane to damp vibrations in the building structure.

16. The building structure according to claim 15 wherein said at least one damper further comprises first and second vertically extending steel plates and a floor surface between said steel plates defining said high-viscosity fluid container.

17. The building structure according to claim 15, further comprising a cover enclosing said high-viscosity fluid container and having a cut-out portion through which said vane extends.

18. The building structure according to claim 15, further comprising a dividing wall extending vertically from a floor surface; said dividing wall dividing said high-viscosity fluid container into two fluid containing portions.

* * * * *